United States Patent Office 3,275,660
Patented Sept. 27, 1966

3,275,660
SUBSTITUTED 2,7-DIOXASPIRO(4.4)NONANES
Burton Kendall Wasson, 103 Broadview Ave., Valois, Quebec, Canada, and John Mulvin Parker, 480 Three Valley Crescent, London, Ontario, Canada
No Drawing. Filed Dec. 2, 1965, Ser. No. 511,212
7 Claims. (Cl. 260—347.7)

This application is a continuation-in-part of application Serial No. 283,536, filed May 27, 1963.

This invention relates to novel 3,3-dimethyl-8-(substituted methyl)-2,7-dioxaspiro(4.4)nonanes and processes for their manufacture.

The new compounds may be represented by the structure:

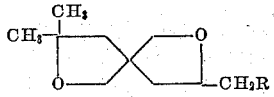

wherein R represents di(lower alkyl)amino; di(lower alkyl)amino(lower alkyl)amino; Y-phenyl(lower alkyl)-amino, wherein Y may be bromo, methyl, ethyl, methoxy, ethoxy; ortho, meta and parapyridyl (lower alkyl)-amino; bicyclo(2:2:1)-5-hepten-2-yl(lower alkyl)amino; pyrrolidinyl; piperidinyl; morpholinyl; imidazolyl; and halo.

The new 3,3-dimethyl-8-(substituted methyl)-2,7-dioxaspiro(4.4)-nonanes are conveniently prepared by heating the appropriate primary or secondary amine with 3,3-dimethyl - 8 - bromomethyl - 2,7 - dioxaspiro(4.4) - nonane, with purification of the free base by distillation, or by conversion to a salt followed by crystallization. In each case, excess amine was used to serve as a solvent for the reaction mixture. The reaction temperature may be varied from 115° to 160° C. The acid addition salts may be converted to the free base by treatment with alkali or metal carbonates followed by distillation in vacuo.

Furthermore, 3,3 - dimethyl-8-bromomethyl-2,7-dioxaspiro(4.4)-nonane was the major product when 2-methallyl-2-allyl-1,3-propanediol was treated at 0–5° C. with bromine followed by the addition of quinoline at room temperature. Thus cyclization had occurred between the double bond of the methallyl groups and one of the hydroxymethyl groups to afford the tetrahydrofuran ring containing two methyl groups, then bromine addition to the double bond of the alkyl group, followed by elimination of hydrogenbromide by quinoline afforded the second tetrahydrofuran ring containing a bromo-methyl group.

The novel 3,3-dimethyl-8-bromo-methyl-2,7-dioxaspiri-(4.4)-nonane used as starting material was obtained by treatment of 2,2-di-methyl-4-allyl-4-hydroxymethyltetrahydrofuran with bromine in a suitable solvent such as diethyl ether to give 2,2-dimethyl-4(2,3-dibromopropyl)-4-hydroxymethyltetrahydrofuran, followed by ring closure using quinoline to remove the elements of hydrogen bromide.

Suitable variables are illustrated by the following typical examples:

3,3-dimethyl-8-bromomethyl-2,7-dioxaspiro(4.4)nonane
3,3-dimethyl-8-dibutylaminomethyl-2,7-dioxaspiro(4.4)-nonane hydrochloride
3,3-dimethyl-8-dimethylaminomethyl-2,7-dioxaspiro(4.4)-nonane
3,3-dimethyl-8-diethyl-aminomethyl-2,7-dioxaspiro(4.4)-nonane
3,3-dimethyl-8-dipropylaminomethyl-2,7-dioxaspiro(4.4)-nonane
3,3-dimethyl-8-diisopropylaminomethyl-2,7-dioxaspiri-(4.4)nonane
3,3-dimethyl-8-disecbutylaminomethyl-2,7-dioxaspiro-(4.4)nonane
3,3-dimethyl-8-ditertbutylaminomethyl-2,7-dioxaspiro-(4.4)nonane
3,3-dimethyl-8-diamylaminomethyl-2,7-dioxaspiro(4.4)-nonane
3,3-dimethyl-8-dihexylaminomethyl-2,7-dioxaspiro(4.4)-nonane
3,3-dimethyl-8-(3-diethylaminopropylaminomethyl)-2,7-dioxaspiro(4.4)nonane
3,3-dimethyl-8-(3-diethylaminopropylaminomethyl)-2,7-dioxaspiro(4.4)nonane dihydrobromide
3,3-dimethyl-8-(N,N-dimethylaminomethyl-aminomethyl)-2,7-dioxaspiro(4.4)nonane
3,3-dimethyl-8-(N,N-diethylaminomethylaminomethyl)-2,7-dioxaspiro(4.4)nonane
3,3-dimethyl-8-(N,N-dipropylaminomethylaminomethyl)-2,7-dioxaspiro(4.4)nonane
3,3-dimethyl-8-(2-dimethylaminoethylaminomethyl)-2,7-dioxaspiro(4.4)nonane
3,3-dimethyl-8-(2-diethylaminoethylaminomethyl)-2,7-dioxaspiro(4.4)nonane
3,3-dimethyl-8-(2-dipropylaminoethylaminomethyl)-2,7-dioxaspiro(4.4)nonane
3,3-dimethyl-8-(3-dimethylaminopropylaminomethyl)-2,7-dioxaspiro(4.4)nonane
3,3-dimethyl-8-(3-dipropylaminopropylaminomethyl)-2,7-dioxaspiro(4.4)nonane
3,3-dimethyl-8-(2-(p-chlorophenylethyl)aminomethyl)-2,7-dioxaspiro(4.4)nonane
3,3-dimethyl-8-(2-(p-chlorophenylethyl)-aminomethyl)-2,7-dioxaspiro(4.4)nonane hydrochloride
3,3-dimethyl-8-(o-, m-, or p-chlorophenylalkylaminomethyl)-2,7-dioxaspiro(4.4)nonane
3,3-dimethyl-8-(m-pyridylmethylaminomethyl)-2,7-dioxaspiro(4.4)nonane
3,3-dimethyl-8-(m-pyridylmethylaminomethyl)-2,7-dioxaspiro-(4.4)nonane dihydrochloride
3,3-dimethyl-8-(o-pyridylmethylaminomethyl)-2,7-dioxaspiro(4.4)nonane
3,3-dimethyl-8-(p-pyridylmethylaminomethyl)-2,7-dioxaspiro-(4.4)nonane
3,3-dimethyl-8-(o-pyridylaminomethyl)-2,7-dioxaspiro-(4.4)nonane
3,3-dimethyl-8-(m-pyridylaminomethyl)-2,7-dioxaspiro-(4.4)nonane
3,3-dimethyl-8-(p-pyridylaminomethyl)-2,7-dioxaspiro-(4.4)nonane
3,3-dimethyl-8-(2-o-pyridylethylaminomethyl)-2,7-dioxaspiro(4.4)nonane
3,3-dimethyl-8-(2-m-pyridylethylaminomethyl)2,7-dioxaspiro(4.4)nonane
3,3-dimethyl-8-(2-p-pyridylethylaminomethyl)-2,7-dioxaspiro(4.4)nonane
3,3-dimethyl-8-(2-bicyclo(2:2:1)-5-heptenyl-methyl-aminomethyl)-2,7-dioxaspiro(4.4)nonane
3,3-dimethyl-8-(2-bicyclo(2:2:1)-5-heptenylmethyl-aminomethyl)-2,7-dioxaspiro(4.4)nonane hydrochloride
3,3-dimethyl-8-(N-pyrrolidinylmethyl)-2,7-dioxaspiro-(4.4)nonane
3,3-dimethyl-8-(N-pyrrolidinylmethyl)-2,7-dioxaspiro-(4.4)nonane hydrochloride
3,3-dimethyl-8-(N-piperidylmethyl)-2,7-dioxaspiro(4.4)-nonane
3,3-dimethyl-8-morpholinylmethyl-2,7-dioxaspiro(4.4)-nonane
3,3-dimethyl-8-(N-morpholinylmethyl)-2,7-dioxaspiro-(4.4)nonane hydrochloride
3,3-dimethyl-8-(N-morpholinylmethylaminomethyl)-2,7-dioxaspiro(4.4)nonane 3,3-dimethyl-8-(2-(N-morpholinylethyl)-aminomethyl)-2,7-dioxaspiro(4.4)nonane 3,3-dimethyl-8-(3-(N-morpholinylpropyl)aminomethyl)-2,7-dioxaspiro(4.4)nonane 3,3-dimethyl-8-(1-imidazolylmethyl)-2,7-dioxaspiro(4.4)-nonane The compounds to which this invention relates are useful because of their valuable pharmacological properties. Thus, for example, 3,3-dimethyl-8-bromomethyl-2,7- dioxaspiro(4.4)nonane, 3,3-dimethyl - 8 - (3-diethylaminopropylaminomethyl)-2,7-dioxaspiro(4.4)nonane dihydrobromide and 3,3-dimethyl-8-(2-bicyclo(2:2:1)-5-heptenylmethylaminomethyl) - 2,7 - dioxaspiro(4.4)nonane hydrochloride exhibit sedative properties when tested on a strain of laboratory rats, as seen by gross observation. Some of them, for example:

3,3-dimethyl-8-bromomethyl-2,7-dioxaspiro(4.4)nonane
3,3 - dimethyl-8-(3-diethylaminopropylaminomethyl)-2,7-dioxaspiro(4.4)nonane dihydrobromide
3,3 - dimethyl - 8 - (2-bicyclo(2:2:1) - 5 - heptenylmethylaminomethyl) - 2,7 - dioxaspiro(4.4)nonane hydrochloride
3,3 - dimethyl-8-(N-piperidylmethyl)-2,7-dioxaspiro(4.4) nonane hydrochloride
3,3-dimethyl-8-(2 - (p-chlorophenylethyl) - aminomethyl-2,7-dioxaspiro(4.4)nonane hydrochloride are capable of blocking or depressing the psychotomimetic effects of p-chlorophenylethylamine (an analogue of mescaline) and mescaline.

The preparations of the present invention will be more fully understood by referring to the following examples:

EXAMPLE I

*3,3-dimethyl-8-bromomethyl-2,7-dioxaspiro(4.4)nonane*

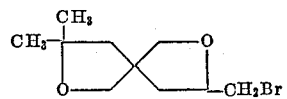

2,2 - dimethyl-4-allyl-4-hydroxymethyltetrahydrofuran (76.5 grams) in 450 ml. of anhydrous ethyl ether was cooled to —5° C. Then 72 grams of bromine was added dropwise during a period of 75 minutes. The mixture was stirred a further 15 minutes. Quinoline (58.2 grams) dissolved in 150 ml. of anhydrous ether was added during a period of 25 minutes while maintaining the internal temperature at 20–25° C. The solid was collected, triturated several times with ether, the combined ethereal extracts washed with 3 N hydrochloric acid, water and evaporated. The residue was distilled at 95–137° C./10 mm. to give 60.9 grams of 3,3-dimethyl-8-bromomethyl-2,7-dioxaspiro(4.4)nonane, $n_D^{22}$ 1.4882. Redistillation of this product through a spinning band afforded an analytical sample of 3,3-dimethyl-8-bromomethyl-2,7-dioxaspiro(4.4) nonane boiling at 122° C./6 mm., $n_D^{25}$ 1.4910.

*Analysis.*—Caclulated for $C_{10}H_{17}BrO_2$: C: 48.22%, H: 6.88%. Found: C: 48.35%, H: 6.74%.

Infrared analyses confirmed the presence of the bromo substituent, methyl groups, and the —C—O—C— grouping in the tetrahydrofuran rings and the absence of the hydroxy group and terminal unsaturation.

EXAMPLE II

*3,3-dimethyl-8-dibutylaminomethyl-2,7-dioxaspiro(4.4)nonane*

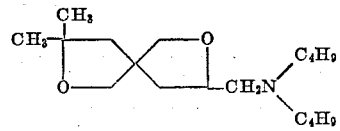

A solution of 10 grams of 3,3-dimethyl-8-bromomethyl-2,7-dioxaspiro(4.4)nonane and 20 grams of dibutylamine was heated and stirred for 3 hours at 110–120° C. The cooled reaction mixture was treated with 1.6 grams of sodium hydroxide in 15 ml. of water and extracted with ether. The extract was concentrated and the 10.8 grams of crude product was converted into the hydrochloride salt. Recrystallization of this salt from ethyl acetate and ligroine gave 3,3 - dimethyl - 8 - dibutylaminomethyl-2,7-dioxaspiro(4.4)nonane hydrochloride having a M.P. of 112–114° C. This salt was hydroscopic and an analytical sample of the free base was obtained as follows. The salt was dissolved in water, the solution made basic, extracted with ether, and distilled to give pure 3,3-dimethyl-8-dibutylaminomethyl-2,7-dioxaspiro(4.4)nonane boiling at 96–97° C./0.05 mm., $n_D^{25}$ 1.4588.

*Analysis.*—Calculated for $C_{18}H_{35}NO_2$: C: 72.67%, H: 11.86%, N: 4.71%. Found: C: 72.88%, H: 11.74%, N: 4.88%.

Infrared analysis showed the disappearance of the bromo groups.

Similarly, condensation of 3,3-dimethyl-8-bromomethyl-2,7-dioxaspiro(4.4)nonane with dimethylamine, diethylamine, dipropylamine, diisopropylamine, disecondary-butylamine, ditertiarybutylamine, diamylamine and dihexylamine would give 3,3-dimethyl-8-dimethylaminomethyl-2,7-dioxaspiro(4.4)nonane, 3,3-dimethyl-8-diethylaminomethyl-2,7-dioxaspiro(4.4)nonane, 3,3-dimethyl-8-dipropylaminomethyl-2,7-dioxaspiro(4.4)nonane, 3,3-dimethyl - 8 - diisopropylaminomethyl - 2,7 - dioxaspiro(4.4)nonane, 3,3-dimethyl-8-disec. butylaminomethyl-2,7-dioxaspiro(4.4)nonane, 3,3-dimethyl-8-ditert.butylaminomethyl-2,7-dioxaspiro(4.4)nonane, 3,3-dimethyl-8-diamylaminomethyl-2,7-dioxaspiro - (4.4)nonane, and 3,3-dimethy-8-dihexylaminomethyl-2,7 - dioxaspiro(4.4)nonane respectively.

EXAMPLE III

*3,3-dimethyl-8-(3-diethylaminopropylaminomethyl)-2,7-dioxaspiro(4.4)nonane*

A solution of 24.9 grams of 3,3-dimethyl-8-bromomethyl-2,7-dioxaspiro(4.4)nonane and 39 grams of 3-diethylaminopropylamine was refluxed 3 hours (internal temperature being 157° C.), left overnight at room temperature, and evaporated in vacuo. The residue was diluted with sufficient aqueous hydrochloric acid to make the solution strongly acidic and then extracted with ether to remove the unchanged 3,3-dimethyl-8-bromomethyl-2,7-dioxaspiro(4.4)nonane. The aqueous layer was made basic with dilute sodium hydroxide and extracted with ether. The combined ethereal extracts were washed with water and evaporated to give 23.3 grams of residue. Distillation of this residue afforded 20.5 grams of 3,3-dimethyl - 8 - (3 - diethylaminopropylaminomethyl-2,7-dioxaspiro(4.4)nonane boiling at 140–182° C./6 mm. This material was redistilled using a spinning band column to give relatively pure 3,3-dimethyl-8-(3-diethylaminopropylaminomethyl)-2,7-dioxaspiro(4.4)nonane boiling at 158–160° C./6 mm. Treatment of the free base with hydrobromic acid afforded an analytical sample of 3,3-dimethyl - 8 - (3 - diethylaminopropylaminomethyl)-2,7-dioxaspiro(4.4)nonane dihydrobromide having a melting point of 98–101° C. when recrystallized from anhydrous acetone.

*Analysis.*—Calculated for $C_{17}H_{34}O_2N_2 \cdot 2HBr$; C: 44.34%, H: 8.01%, N: 5.95%. Found: C: 44.35%, H: 7.88%, N: 6.09%.

Similarly, condensation of 3,3-dimethyl-8-bromomethyl-2,7-dioxaspiro(4.4)nonane with the appropriate dialkylaminoalkylamine would give the following compounds: 3,3 - dimethyl - 8 - (N,N-dimethylaminomethylaminomethyl)-2,7-dioxaspiro(4.4)nonane, 3,3-dimethyl-8-(N,N- diethylaminomethylaminomethyl) - 2,7 - dioxaspiro(4.4)-nonane, 3,3-dimethyl-8-(N,N-dipropylaminomethylaminomethyl)-2,7-dioxaspiro(4.4)nonane, 3,3-dimethyl-8-(2-dimethylaminoethylaminomethyl) - 2,7-dioxaspiro(4.4)nonane, 3,3-dimethyl-8-(2-diethylaminoethylaminomethyl)-2,7 - dioxaspiro(4.4)nonane, 3,3-dimethyl-8-(2-dipropylaminoethylaminomethyl)-2,7-dioxaspiro-(4.4)nonane, 3,3-dimethyl - 8-(3 - dimethylaminopropylaminomethyl)-2,7-dioxaspiro(4.4)nonane, 3,3-dimethyl-8-(3-dipropylaminopropylaminomethyl)-2,7-dioxaspiro(4.4)nonane, and their acid addition salts.

EXAMPLE IV

*3,3-dimethyl-8-(2-(p-chlorophenylethyl)aminomethyl)-2,7-dioxaspiro(4.4)nonane*

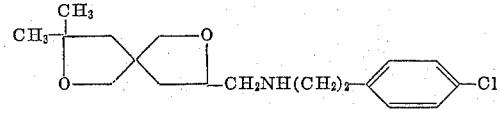

In the same manner as set forth in Example III, a mixture of 20 grams of 3,3-dimethyl-8-bromomethyl-2,7-dioxaspiro(4.4)nonane and 37.4 grams of p-chlorophenethylamine was heated 4 hours at 125–150° C. and the product was distilled under reduced pressure to give 18.3 grams of 3,3-dimethyl-8-(2-(p-chlorophenylethyl)aminoethyl)-2,7-dioxaspiro(4.4)nonane as a colourless oil boiling at 140–155°/0.05 mm., $n_D^{20}$ 1.5240. A solution of the free base in concentrated hydrochloric acid was evaporated in vacuo, and the residue dried by repeated evaporation from a solution of benzene and alcohol. The resulting 3,3 - dimethyl-8-(2-(p-chlorophenylethyl)-aminomethyl)-2,7-dioxaspiro(4.4)nonane hydrochloride was recrystallized from methanol and ethyl ether melting at 220° C. (decomposition).

*Analysis.*—Calculated for $C_{18}H_{20}ClNO_2 \cdot HCl$: C, 60.00%; H, 8.09%; N, 3.89%. Found: C, 60.08%; H, 8.25%; N, 3.92%.

Similarly, condensation of 3,3-dimethyl-8-bromomethyl-2,7-dioxaspiro(4.4)nonane with the appropriate o-, m- or p-(aminoalkylphenyl) chloride gives the corresponding 3,3-dimethyl-8-(o-, m- or p-chlorophenylalkylaminomethyl)-2,7-dioxaspiro(4.4)nonane wherein the alkyl group may contain from one to six carbon atoms. Condensations may be carried out with amines of the general formula

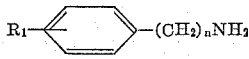

wherein $R_1$ represents a group, o-, m- or p-, such as bromide, methyl, ethyl, methoxy, ethoxy, etc. and $n$ consists of whole numbers from one to six. The acid addition salts of the above products may be considered as a part of this invention.

EXAMPLE V

*3,3-dimethyl-8-(m-pyridylmethylaminomethyl)-2,7-dioxaspiro(4.4)nonane*

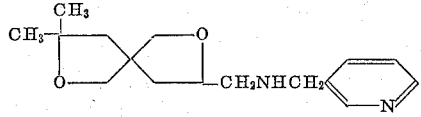

In the same manner as set forth in Example II, a mixture of 17.9 grams of 3,3-dimethyl-8-bromomethyl-2,7-dioxaspiro(4.4)nonane and 23.1 grams of 3-picolylamine was heated 6 hours at 110–117° C. The basic fraction was treated with dilute hydrochloric acid, the solution evaporated to dryness and the solid recrystallized from ethanol and ethyl acetate to give 3,3-dimethyl-8-(m-pyridylmethylaminomethyl)-2,7-dioxaspiro(4.4)nonane dihydrochloride. The salt was too hygroscopic to afford an analytical sample. Therefore treatment of the salt with dilute sodium hydroxide, extraction with ether, and distillation of the crude product gave analytically pure 3,3-dimethyl - 8 - (m-pyridylmethylaminomethyl)2,7-dioxaspiro(4.4)nonane boiling at 141.5–143.0°/0.05 mm., $n_D^{25}$ 1.5183.

*Analysis.*—Calculated for $C_{16}H_{24}N_2O_2$: C, 69.53%; H, 8.75%; N, 10.14%. Found: C, 69.60%; H, 8.77%; N, 10.39%.

Similarly, condensation of 3,3-dimethyl-8-bromo-methyl-2,7-dioxaspiro(4.4)nonane with the appropriate o-, m- and p-(aminoalkyl)pyridine gives the following compounds:

3,3-dimethyl-8-(o-pyridylmethylaminomethyl)2,7-dioxaspiro(4.4)nonane,
3,3-dimethyl-8-(p-pyridylmethylaminomethyl)2,7-dioxaspiro(4.4)nonane,
3,3-dimethyl-8-(o-pyridylaminomethyl)-2,7-dioxaspiro-(4.4)nonane,
3,3-dimethyl-8-(m-pyridylaminomethyl)-2,7-dioxaspiro-(4.4)nonane,
3,3-dimethyl-8-(p-pyridylaminomethyl)-2,7-dioxaspiro-(4.4)nonane,
3,3-dimethyl-8-(2-o-pyridylethylaminomethyl)-2,7-dioxaspiro(4.4)nonane,
3,3-dimethyl-8-(2-m-pyridylethylaminomethyl)-2,7-dioxaspiro(4.4)nonane,
3,3-dimethyl-8-(2-p-pyridylethylaminomethyl)-2,7-dioxaspiro(4.4)nonane, and acid addition salts.

EXAMPLE VI

*3,3-dimethyl-8-(2-bicyclo(2:2:1)-5-heptenylmethylaminomethyl)-2,7-dioxaspiro(4.4)nonane*

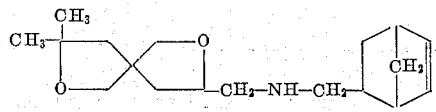

In the same manner as set forth in Example III, a mixture of 20 grams of 3,3-dimethyl-8-bromomethyl-2,7-dioxaspiro(4.4)nonane and 29.7 grams of 2-aminomethylbicyclo(2:2:1)-5-heptene was heated 3 hours at 130° C. The crude product was distilled to give 3,3-dimethyl-8-(2-bicyclo(2:2:1) - 5 - heptenylmethylaminomethyl)-2,7-dioxaspiro(4.4)nonane boiling at 134–142° C./0.05 mm., $n_D^{26}$ 1.4951. Treatment of the free base with dilute hydrochloric acid gave an analytical sample of 3,3-dimethyl-8 - (2-bicyclo(2:2:1)-5-heptenylmethylaminomethyl)2,7-dioxaspiro(4.4)nonane hydrochloride melting at 193–195° C.

*Analysis.*—Calculated for $C_{18}H_{29}NO_2 \cdot HCl$: C, 65.93%; H, 9.22%; N, 4.27%. Found: C, 66.14%; H, 8.91%; N, 4.26%.

EXAMPLE VII

*3,3-dimethyl-8-(N-pyrrolidinylmethyl)-2,7-dioxaspiro(4.4)nonane*

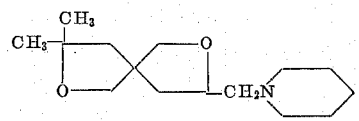

In the same manner as set forth in Example III, a mixture of 3,3-dimethyl-8-bromomethyl-2,7-dioxaspiro(4.4)-nonane and pyrrolidine was refluxed for a period of 2 hours. The excess pyrrolidine was removed by distillation in vacuo. The residue was treated with dilute hydrochloric acid, and the product was recrystallized from acetone-ethyl ether to give pure 3,3-dimethyl-8-(N-pyrrolidinylmethyl) - 2,7-dioxaspiro(4.4)nonane hydrochloride melting at 169.5–170.5° C.

*Analysis.*—Calculated for $C_{14}H_{25}NO_2 \cdot HCl$: C, 60.96%; H, 9.50%; N, 5.08%. Found: C, 61.28%; H, 9.50%; N, 4.97%.

EXAMPLE VIII

*3,3-dimethyl-8-(N-piperidylmethyl)-2,7-dioxaspiro(4.4)nonane*

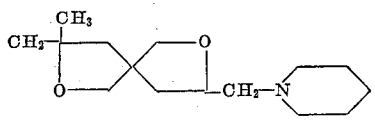

In the same manner as set forth in Example III, a mixture of 15.9 grams of 3,3-dimethyl-8-bromomethyl-2,7-dioxaspiro(4.4)nonane and 15.3 grams of piperidine was heated one hour at 135° C. The crude product was distilled at 94–110° C./0.04 mm. to give 13.0 grams of 3,3-dimethyl - 8 - (N-piperidylmethyl)-2,7-dioxaspiro(4.4)nonane. The hydrochloride salt was prepared, melting at 168–170° C. An analytical sample of 3,3-dimethyl-8-(N-piperidylmethyl)-2,7-dioxaspiro(4.4)nonane was obtained by neutralizing the recrystallized hydrochloride and distilling the free base through a spinning band column boiling at 82° C./0.05 mm., $n_D^{25}$ 1.4805.

*Analysis.*—Calculated for $C_{15}H_{27}NO_2$: C, 71.10%; H, 10.74%; N, 5.53%. Found: C, 71.13%; H, 10.32%; N, 5.46%.

EXAMPLE IX

*3,3-dimethyl-8-morpholinylmethyl-2,7-dioxaspiro(4.4)nonane*

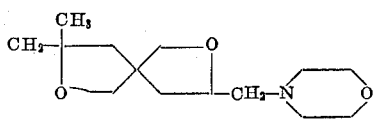

In the same manner as set forth in Example III a mixture of 20 grams of 3,3-dimethyl-8-bromomethyl-2,7-dioxaspiro(4.4)nonane and 21 grams of morpholine was heated 4 hours at 120–125° C. The product was distilled to give 13.5 grams of 3,3-dimethyl-8-morpholinylmethyl-2,7-dioxaspiro(4.4)monane boiling at 115–136.5° C./0.05 mm., $n_D^{25}$ 1.4801. The free base was treated with hydrochloric acid and the product crystallized to give 3,3-dimethyl - 8-(N-morpholinylmethyl)-2,7-dioxaspiro(4.4)-nonane hydrochloride melting at 158–162° C.

*Analysis.*—Calculated for $C_{14}H_{25}NO_3 \cdot HCl$: C: 57.62%, H: 8.98%, N: 4.80%. Found: C: 57.88%, H: 9.33%, N: 4.77%.

Similarly, condensation of 3,3-dimethyl-8-bromomethyl - 2,7-dioxaspiro(4.4)nonane with N-aminomethylmorpholine, N-(2-aminoethyl)morpholine, and N-(3-aminopropyl)morpholine gives 3,3-dimethyl-8-(N-morpholinyl-methylaminomethyl) - 2,7-dioxaspiro(4.4)nonane, 3,3,-dimethyl - 8-(2-N-morpholinylethyl)-aminomethyl)-2,7-dioxaspiro(4.4)nonane, and 3,3,-dimethyl-8-(3-N-morpholinylpropyl)aminomethyl)-2,7-dioxaspiro(4.4)nonane, respectively.

The acid addition salts of the above compounds may be prepared.

EXAMPLE X

*3,3-dimethyl-8-(1-imidazolylmethyl)-2,7-dioxaspiro-(4.4)nonane*

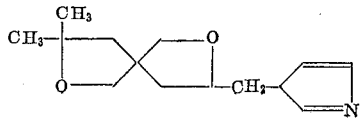

In the same manner as set forth in Example III, a mixture of 20 grams of 3,3-dimethyl-8-bromomethyl-2,7-dioxaspiro(4.4)nonane and 10.9 grams of imidazole was heated 4 hours at 125–135° C. The crude product was distilled to give pure 3,3-dimethyl-8-(1-imidazolylmethyl)-2,7-dioxaspiro(4.4)nonane boiling at 130–132° C./0.05 mm., $n_D^{25}$ 1.5031. The hyrochloride salt was prepared in the customary manner melting at 153–158° C.

*Analysis.*—Calculated for $C_{13}H_{20}N_2O_2$: C: 66.07%, H: 8.53%, N: 11.86%. Found: C: 66.19%, H: 8.63%, N: 11.46%.

All of the compounds of the present invention which have an amino group are useful as curing agents for urea formaldehyde and melamine formaldehyde resins. The amino group can be either an aliphatic amino group or a heterocyclic amino group. The compounds of the present invention which are not in the form of a free base can be converted into their hydrochloride salt, and in such form are also useful as curing agents for melamine formaldehyde and urea formaldehyde resins. Thus, any of the compounds of Examples II through X are useful as curing agents for melamine formaldehyde resins.

We claim:
1. A compound of the formula:

and non-toxic acid addition salts thereof wherein R is a member of the group consisting of (1) Y-phenyl(lower alkyl)amino where Y is a member of the group consisting of bromo, methyl, ethyl, methoxy and ethoxy, and (2) bicyclo(2:2:1)-5-hepten-2-yl(lower alkyl)amino.

2. A compound of claim 1 which is 3,3-dimethyl-8-(2 - (p - chlorophenylethyl)-aminomethyl)-2,7-dioxaspiro-(4.4)nonane hydrochloride.

3. A compound of claim 1 which is 3,3-dimethyl-8-(ortho - chlorophenylalkylaminomethyl)-2,7-dioxaspiro-(4.4)nonane.

4. A compound of claim 1 which is 3,3,-dimethyl-8-(meta - chlorophenylalkylaminomethyl)-2,8-dioxaspiro-(4.4)nonane.

5. A compound of claim 1 which is 3,3,-dimethyl-8-(para - chlorophenylalkylaminomethyl) - 2,7-dioxaspiro-(4.4)nonane.

6. A compound of claim 1 which is 3,3,-dimethyl-8-(2 - bicyclo(2:2:1)-5-heptenyl-methylaminomethyl)-2,7-dioxaspiro(4.4)nonane.

7. A compound of claim 1 which is 3,3-dimethyl-8-(2 - bicyclo(2:2:1)-5-heptenylmethylaminomethyl)-2,7-dioxaspiro(4.4)nonane hydrochloride.

No references cited.

NICHOLAS S. RIZZO, *Primary Examiner.*